United States Patent [11] 3,591,725

[72] Inventors Charles E. Morse
Holmdel;
John P. Smith, Holmdel; Ralph Truby,
Rumson, all of, N.J.
[21] Appl. No. 840,905
[22] Filed July 11, 1969
[45] Patented July 6, 1971
[73] Assignee Bell Telephone Laboratories, Incorporated
Murray Hill, N.J.

[54] SHARED USAGE OF KEY TELEPHONE SYSTEM LINE CIRCUITS

9 Claims, 5 Drawing Figs.

[52] U.S. Cl. 179/18 AD, 179/99
[51] Int. Cl. H04m 3/42
[50] Field of Search 179/18 AD, 18 AB, 18 D, 18 DA, 27 CA, 99

[56] References Cited

UNITED STATES PATENTS 3,299,217 1/1967 Burns 179/99

FOREIGN PATENTS 1,233,025 1/1967 Germany 179/18 (AD)

*Primary Examiner*—William C. Cooper
*Assistant Examiner*—Thomas W. Brown
*Attorneys*—R. J. Guenther and James Warren Falk

ABSTRACT: A key telephone system is arranged to provide access for any number of key telephone stations to any number of line circuits. When two or more stations are selectively connected to the same line circuit, the transmission capability of each such station is placed under control of a push-to-talk key at that station. The line circuit is associated with a selector for scanning each such connected station sequentially and for providing exclusive transmission capability to a first detected station having an operated push-to-talk key. On simultaneous connections to certain line circuits, the enabling of an override key at any of the connected stations provides unlimited transmission capability from that station without regard to the operational status of the push-to-talk key.

INVENTORS C. E. MORSE
J. P. SMITH
R. TRUBY
BY
David Mannenbaum
ATTORNEY

SHARED USAGE OF KEY TELEPHONE SYSTEM LINE CIRCUITS

BACKGROUND OF THE INVENTION

This invention relates generally to key telephone switching systems and, more particularly, to circuitry for enabling concurrent connections to a line circuit from more than one key telephone station.

DESCRIPTION OF THE PRIOR ART

Extensive development in private branch exchange (PBX) telephone systems in recent years has made possible the provisions of numerous special features which render such PBX telephone systems more convenient and flexible. For example, circuit arrangements have been provided which enable communication paths to be established from one telephone station to any one of a number of other stations or to any one of a number of line circuits by simply operating a key associated with the desired connection.

In such arrangements, it is common practice to arrange the switching network such that connections to a particular line circuit may be made concurrently from a number of key telephone stations. Problems arise, however, because some types of line circuits can handle transmission from only one station at a time thereby necessitating the use of a push-to-talk switch at each such station to control transmission therefrom.

Other line circuits also may be similarly limited in transmission reception capability except that under certain conditions these line circuits may handle simultaneous transmission from more than one station. Still other line circuits may not be restricted at all and may handle concurrent transmission at all times. Therefore, while transmission must originate from only one station on concurrent connections to certain line circuits, transmission may be unlimited on concurrent connections to other line circuits and the necessity of operating a push-to-talk key on all such connections is inconvenient and undesirable.

Accordingly, a need exists in the art for a key telephone system arranged to limit transmission on concurrent connections to certain lines while providing unrestricted transmission capability on single connections to those lines and on concurrent connections to unrestricted line circuits.

SUMMARY OF THE INVENTION

In one embodiment of the invention, a switching system is arranged such that when two or more stations are simultaneously connected to a line circuit having restricted transmission reception ability the transmission capability of each such station is placed under control of a push-to-talk key at that station. A transmission control circuit associated with the connected line circuit is arranged to scan each such connected station sequentially and to provide exclusive transmission capability to a first detected station having an operated push-to-talk key. This sequentially controlled transmission capability is also provided on concurrent connections to line circuits which are restricted only under certain conditions by transmission control circuits associated with these circuits. However, when a subscriber at a key station determines that unrestricted transmission is possible on a particular connection involving one of these line circuits, the enabling of an override key provides unlimited transmission capability from that station without regard to the operational status of the associated push-to-talk key. Provision is made so that the override keys are only effective on connections to line circuits having variable restrictions thereby insuring that transmission to fully restricted line circuits remains sequentially controlled.

In accordance with one feature of the invention, a plurality of key stations are each arranged with transmission enabling circuitry which is effective on concurrent connections to certain line circuits for signifying to the connected line circuit that transmission from that station is desired and for receiving from the line circuit exclusive transmit capability.

In accordance with another feature of the invention, a key telephone system is arranged to interconnect any one of a number of key stations with any one of a number of line circuits and to provide exclusive transmit capability in sequential fashion to requesting stations concurrently connected to certain line circuits while providing unlimited transmission capability on concurrent connections to other line circuits.

DESCRIPTION OF THE DRAWINGS

The foregoing objects, features and advantages as well as others of the invention will be more apparent from the following description of the drawing in which.

Figure 2:
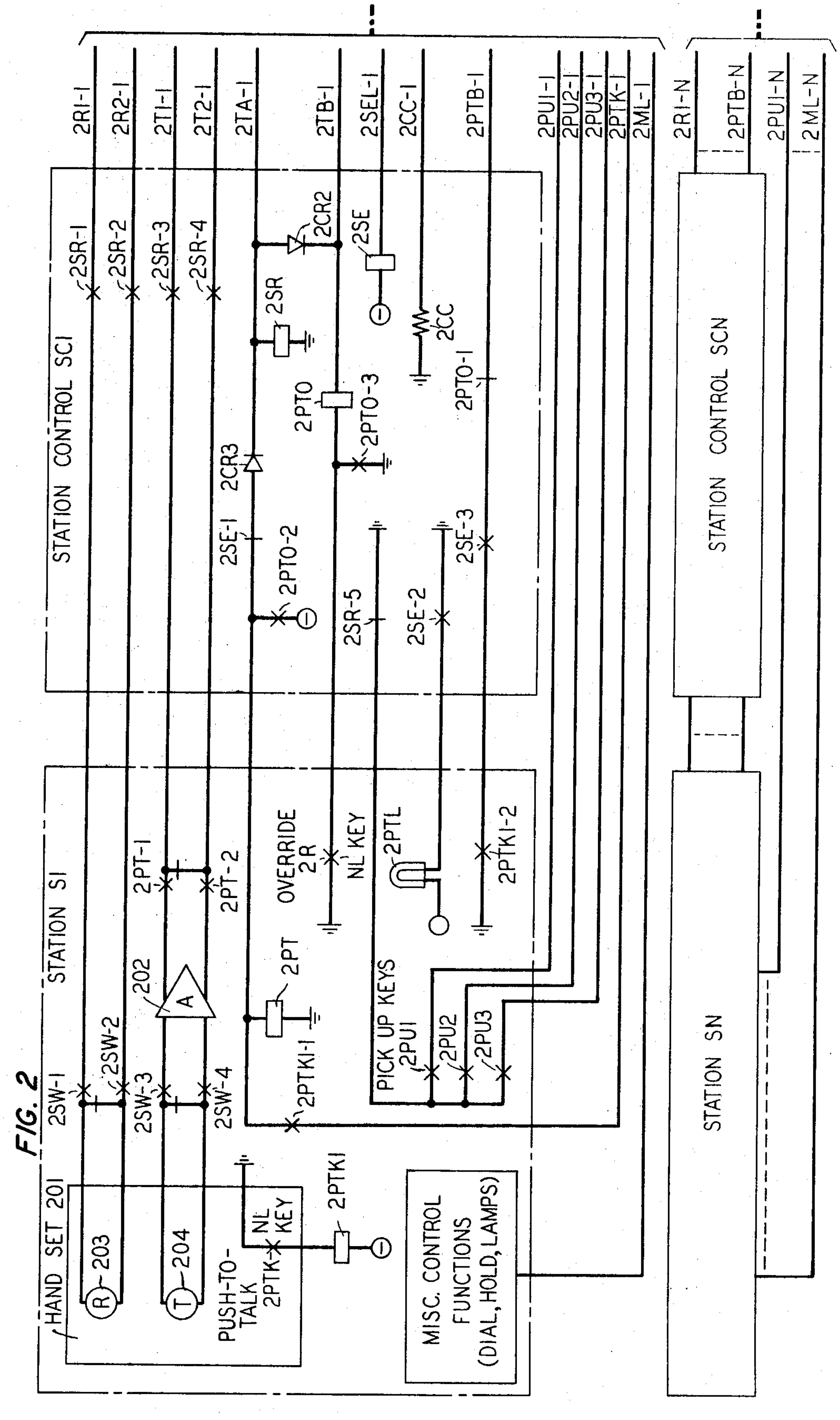
FIGS. 2 through 4 are schematic drawings showing in greater detail the interrelation of the components of the exemplary embodiment.
Figure 3:
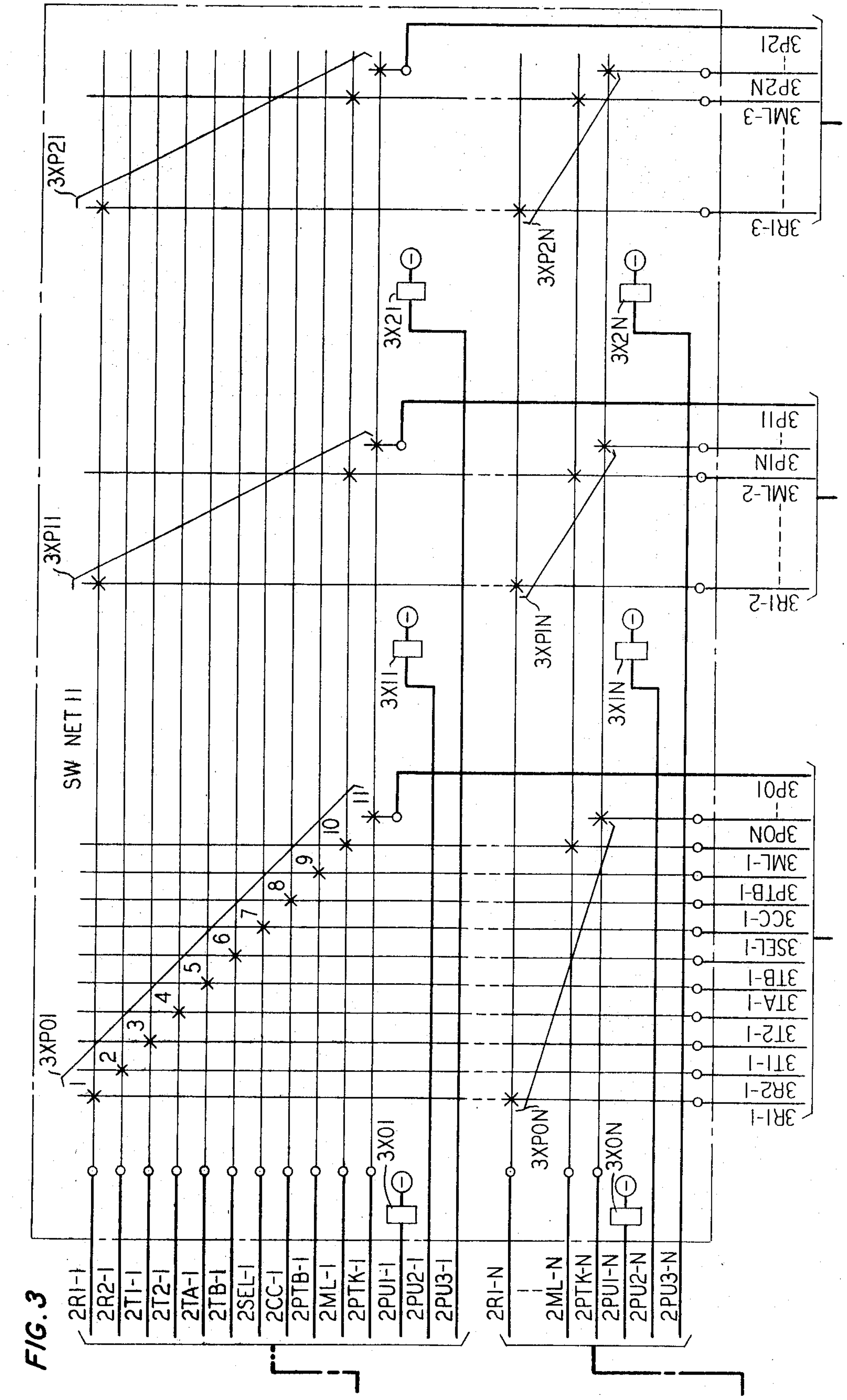
Figure 4:
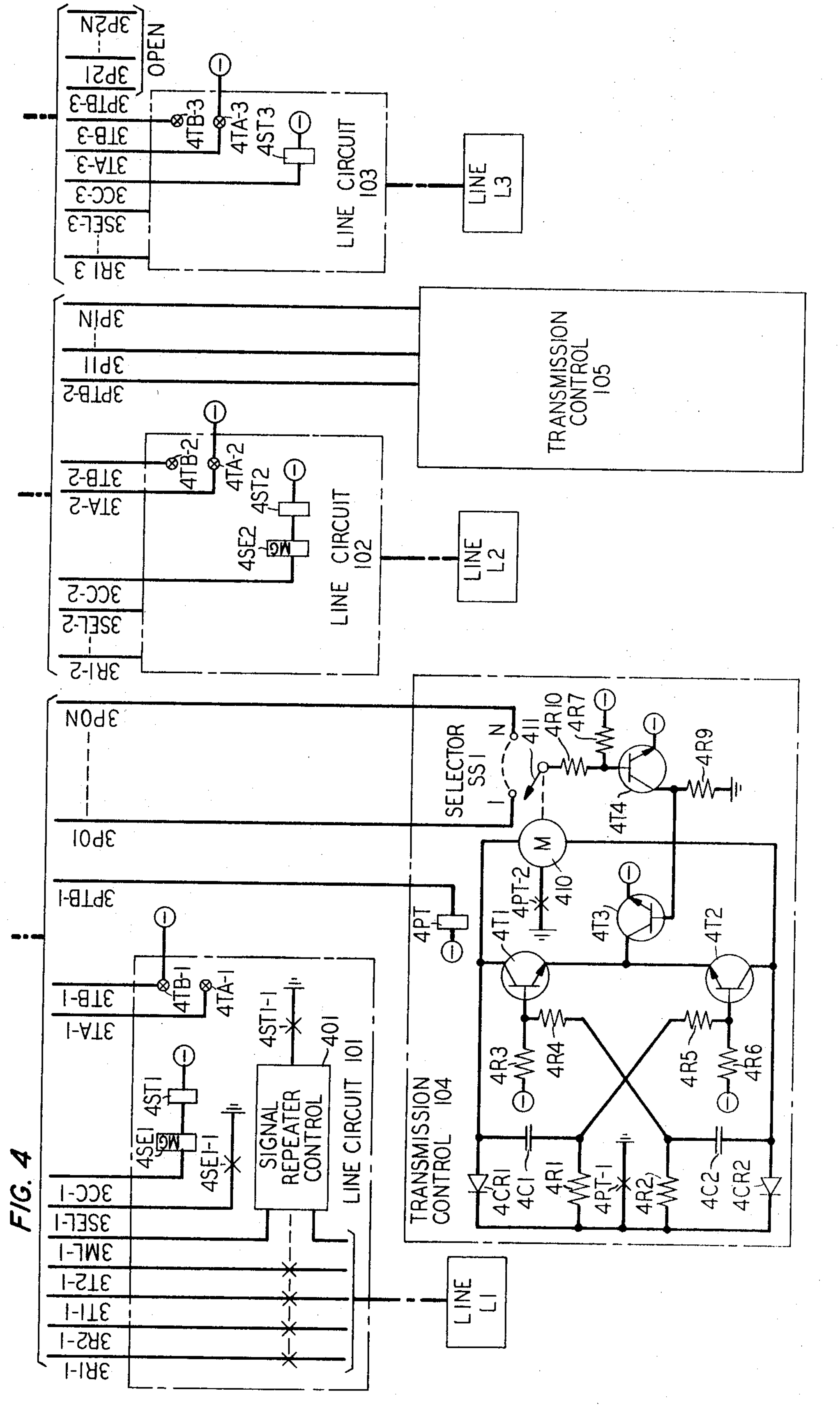

It will be noted that FIGS. 2 through 4 employ a type of notation referred to as "detached contact" in which an "X" shown intersecting a conductor represents a normally open contact of a relay, and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pp 505—513.

It will be noted also that in order to simplify the disclosure and thus facilitate a more complete understanding of the embodiment, the relays, relay contacts and other electromechanical devices shown in FIGS. 2 through 4 have been given systematic designations. Thus, the number preceding the letters of each device correspond to the FIG. in which the control circuit of the device is shown. Thus, the coil of relay 2PT is shown in FIG. 2. Each relay contact, either make, break or transfer, is shown with its specific contact number preceded by the designation of the relay to which it belongs. For example, the notation 2PT-1 indicates contact number 1 of relay 2PT, the coil of which is shown in FIG. 2.

1.0 GENERAL DESCRIPTION

Figures 1, 5:
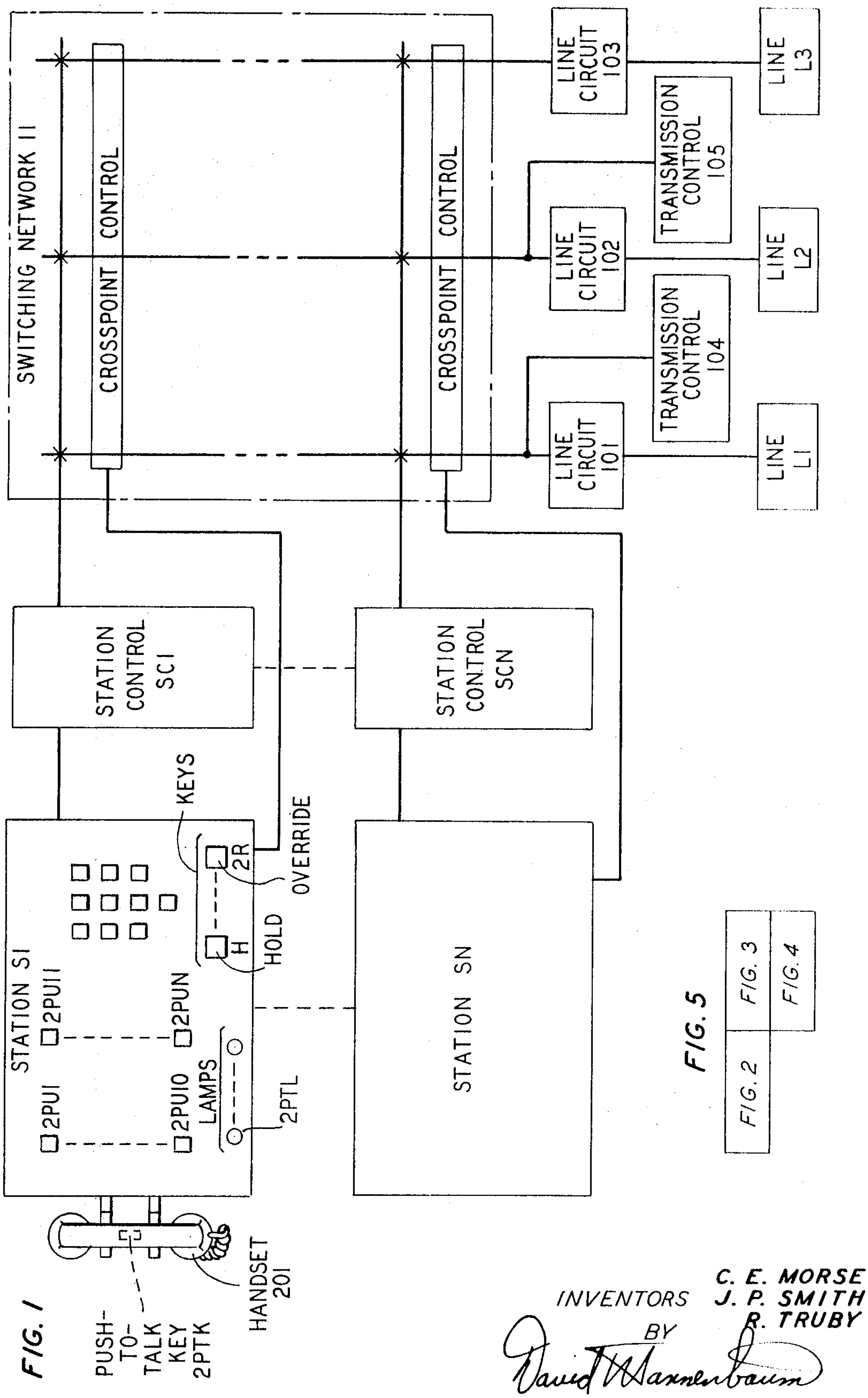
FIG. 1 is essentially a block diagram showing the interrelation of the exemplary embodiment of the invention.
FIG. 5, which is shown on drawing sheet one, shows the manner in which the other FIGS. should be arranged.

Referring now to FIG. 1, the present invention is illustrated in a key telephone system having key stations, S1-SN, each selectively connectable to line circuits 101–102–103 through switching network 11. A station control circuit, such as station control circuit SC1, is serially connected between each key station and switching network 11 which circuit is arranged in the manner to be more fully described hereinafter to cooperate with the switching network and with a transmission control circuit, such as transmission control circuit 104, associated with certain line circuits to provide sequential transmission capability to the associated station on concurrent connections involving that station and the associated line circuit.

Switching network 11 is a cross-point matrix switching network arranged in the well-known manner such that when a cross-point relay associated with a group of contacts, called cross-point contacts, is enabled, a linkage is established between the associated horizontal and vertical multiples. Each horizontal multiple is associated with a particular one of the key stations while each vertical multiple is associated with a separate one of the line circuits. Although only three such vertical multiples are shown in the drawing, it should be understood that any number of such multiples, as well as any number of horizontal multiples, may be utilized for purposes of this invention.

2.0 DETAILED DESCRIPTION

The following text will describe the embodiment of the invention in detail with reference to FIGS. 2, 3 and 4. In order to facilitate a clear understanding of the invention, the following description will illustrate the establishment of a concurrent connection from stations S1 and SN to line circuit 101. In addition, a concurrent connection will be established from those stations to line circuit 102 followed by a concurrent connection to line circuit 103. For illustrative purposes, it will be assumed that line circuit 101 is arranged for transmission from only one station at a time but is capable, under certain conditions, of handling unlimited transmission. We shall further assume that line circuit 102 is arranged for single station transmission without exception and that line circuit 103 has no transmission limitation on concurrent connections.

2.1 CONNECTION FROM STATION S1 TO LINE CIRCUIT 101

Turning now to FIG. 2, let us assume that it is desired to establish a linkage connection from station S1 to line circuit 101 (pickup key 2PU1). Accordingly, ground is provided from released break contact 2SR–5 from station control SC1 to station S1 and through enabled pickup key contact 2PU1 over lead 2PU1–1 to FIG. 3, switching network 11, thereby operating cross-point relay 3X01. Operation of cross-point relay 3X01 enables cross-point contacts 3XP01–1 through 3XP01–11 such that the horizontal multiple associated with station S1, FIG. 2, is electrically connected to the vertical multiple associated with line circuit 101, FIG. 4.

Battery is returned from line circuit 101, FIG. 4, punching 4TB–1 and lead 3TB–1 to enabled cross-point contact 3XP01–6, FIG. 3, and extended over lead 2TB–1 to station control SC1, FIG. 2, through forward biased diode 2CR2 and relay coil 2SR to ground, thereby operating relay 2SR. This battery is further extended through forward-biased diode 2CR3 and released break contact 2SE–1 to operate relay 2PT in station S1. Accordingly, a transmission path is established from handset 201, of station S1, transmitter 204, enabled switch hook contacts 2SW–3 and 2SW–4, amplifier 202 and enabled make contacts 2PT–1 and 2PT–2 to station control SC1 and enabled make contacts 2SR–3 and 2SR–4, over leads 2T1–1 and 2T2–1 to switching network 11, FIG. 3, and enabled cross-point contacts 3XPO1–3 and 3XPO1–4 and over leads 3T1–1 and 3T2–1 to line circuit 101, FIG. 4. A return transmission link (receive path) is similarly enabled from line circuit 101, FIG. 4, through switching network 11, FIG. 3, cross-point contacts 3XPO1–1 and 3XP01–2, leads 2R1–1 and 2R2–1 to station control SC1, FIG. 2, enabled make contacts 2SR–1 and 2SR–2 to station S1, enabled switchhook contacts 2SW–1 and 2SW–2 to receiver 203 of handset 201.

Continuing in FIG. 2, it will be seen that concurrent with the enabling of the transmission path resistance ground from resistor 2CC is extended via lead 2CC–1 from station control SC1 to switching network 11, FIG. 3, and via enabled cross-point contact 3XP01–8 and lead 3CC–1 to line circuit 101, FIG. 4. This resistance ground is extended through the coil of marginal relay 4SE1 and through the coil of relay 4ST1 to battery thereby enabling relay 4ST1. However, relay 4SE1, which is a marginal relay requiring operating current greater than that provided by resistor 2CC, remains normal at this time. The enabling of relay 4ST1–1 enables signal repeater control 401 which is arranged in any one of the well-known circuit configurations operable to extend the transmission leads 3R1–1, 3R2–1, 3T1–1 and 3T2–1 to line L1. Signal repeater control 401 is further arranged to extend control signals from lead 3ML–1 to line L1 which signals are transmitted from station S1 via lead 2ML–1, FIG. 2, through switching network 11, FIG. 3, and lead 3ML–1 to line circuit 101. It is to be understood that although a single lead 3ML–1 is shown many such leads arranged in the well-known manner are, in fact, required for signaling and control purposes.

Reviewing briefly, the enabling of pickup key 2PU1 at station S1, FIG. 2, enables a two-way transmission path to be established from station S1 through station control SC1 and switching network 11, FIG. 3, to line circuit 101, FIG. 4. Accordingly, two-way transmission is possible between station S1 and line circuit 101 under control of battery extended to relay 2PT from station control SC1. The purpose of this control battery will be more fully appreciated from that which is contained hereinafter.

2.2 CONCURRENT CONNECTIONS-SEQUENTIAL TRANSMISSION ENABLING

Turning again to FIG. 2, it will be assumed that station SN now desires to establish a connection to line circuit 101 concurrent with the previously established connection from station S1 to line circuit 101. Accordingly, pickup key 2PUN (not shown) at station SN, which key is associated with line circuit 101, is enabled thereby enabling a transmission path from station SN through station control SCN and switching network 11, FIG. 3, cross-point 3XON to line circuit 101, FIG. 4, in the same manner as previously set forth for a connection from station S1. However, resistance ground (not shown) which is now extended from station control SCN lead 2CC–N through switching network 11 to line circuit 101, FIG. 4, is in parallel with resistance ground from station control SC1 on lead 3CC–1, thereby providing sufficient current to operate marginal relay 4SE1. Accordingly, ground from enabled make contact 4SE1–1 is extended over lead 3SEL–1 through switching network 11, FIG. 3, to operate relay 2SE in station control SC1, FIG. 2 and to operate the corresponding 2SE relay (not shown) in station control SCN. The enabling of relay 2SE removes the enabling battery from relay 2PT via now enabled break contact 2SE–1. Relay 2PT in station S1 and the corresponding 2PT relay (not shown) in station SN both release at this time.

The release of relay 2PT opens the transmission path from the transmitter 204 of station S1 via now released make contacts 2PT–1 and 2PT–2 and, in similar manner, opens the transmission path (not shown) of station SN. Accordingly, transmission capability has now been inhibited from both stations which are concurrently connected to the same line. Ground from enabled make contact 2SE–2 enables lamp 2PTL at the station to inform the subscriber that transmission from that station is now limited.

In the event that the subscriber at station S1 desires to initiate transmission from that station, the push-to-talk key 2PTK at station S1 is enabled, thereby enabling relay 2PTK1 in an obvious manner. Accordingly, ground is extended from enabled make contact 2PTK1–2 and enabled make contact 2SE–3, released break contact 2PT0–1 and lead 2PTB–1 to FIG. 3, switching network 11, and through the switching network to transmission control 104, FIG. 4, over lead 3PTB–1, thereby enabling the operation of relay 4PT therein.

Continuing in FIG. 4, the enabling of relay 4PT provides a ground from enabled make contact 4PT–2 to selector motor 410, which motor is arranged in the well-known manner operable upon the application of ground on one lead and the application of battery to either of a pair of other leads to drive a selector one step for each such battery application. As illustrated in FIG. 4, selector SS1 is driven by selector motor 410 such that a brush 411 makes individual contact with a different terminal 1 through N in sequential fashion, each time the selector is stepped. The brush 411 maintains contact with each terminal as long as the selector remains in that position.

The enabling of relay 4PT also provides a ground to resistors 4R1 and 4R2 which together with other circuit elements form a well-known free-running multivibrator circuit controlled by transistors 4T1 and 4T2. Operate battery is supplied to the free-running multivibrator through conducting transistor 4T3, which transistor is "on" from ground through resistor 4R9 to its base. Transistor 4T4 is "off" at this time since its base, which is extended through resistor 4R10 to brush 411 of selector SS1, is not connected to a source of positive (ground) potential. Accordingly, selector motor 410 is enabled from the battery pulses generated by the free-running multivibrator so as to step selector SS1 one position at a time. This stepping continues until the brush comes into contact with a positive potential on one of the selector terminals in a manner to be more fully detailed hereinafter.

Turning again to FIG. 2, since the subscriber at station S1 has operated the push-to-talk key thereat, ground from relay winding 2PT is extended through the now enabled make contact 2PTK1–1 and lead 2PTK–1 to switching network 11, FIG. 3 and through enabled cross-point contact 3XP01–11 and via lead 3P01 to FIG. 4 transmission control 104, selector SS1 position 1. Accordingly, when selector SS1, which is sequentially stepping through each of the positions 1 through N, steps to position 1, the ground now present thereon, from the enabled push-to-talk key at station S1, is extended through brush 411 and resistor 4R10 to the base of transistor 4T4. Transistor 4T4 now conducts, thereby removing operate ground from the base of transistor 4T3, turning transistor 4T3 off. Operate battery is thereupon removed from the free-running multivibrator causing selector SS1 to stop at this point.

Transistor 4T4 is held conducting by ground through selector SS1 position 1. Resistance battery from resistors 4R7 and 4R10 is returned through the selector and lead 3P01, through switching network 11, FIG. 3, to station S1, FIG. 2, thereby operating relay 2PT. Accordingly, the enabling of relay 2PT enables a transmission path from station S1, via now enabled make contacts 2PT–1 and 2PT–2, as long as push-to-talk key 2PTK at station S1 remains operated. Station S1 thereby retains exclusive transmission capability, under sequential control from selector SS1, while all other stations concurrently connected to line circuit 101, regardless of the status of their respective push-to-talk keys, may not transmit. When push-to-talk key 2PTK at station S1 is released, selector SS1 in transmission control 104, FIG. 4, again begins to step from one position to the next until a ground from an operated push-to-talk key at one of the concurrently connected stations is detected.

2.3 TRANSMISSION LIMITATION OVERRIDE

In the event that any station concurrently connected to line circuit 101 determines that transmission need not be restricted to the origination from one station, the override key 2R thereat is momentarily enabled.

Turning now to FIG. 2, ground is extended from station S1 through the now enabled make contact of key 2R to operate relay 2PT0 in station control SC1. Battery, it will be recalled, was extended to relay 2PT0 via lead 2TB–1 from line circuit 101. Accordingly, relay 2PT0 operates and locks operated from ground via enabled make contact 2PT0–3. The enabling of relay 2PT0 extends battery from now enabled make contact 2PT0–2 to station S1 thereby operating relay 2PT. Accordingly, transmission capability is now extended to station S1 permanently for the duration of the connection to line circuit 101 thereby obviating the necessity for enabling the push-to-talk key when it is desired to transmit therefrom.

2.4 CONCURRENT CONNECTIONS TO LINE CIRCUIT 102

Connections to line circuit 102 are established in the same manner as previously described for connections to line circuit 101. However, as detailed in FIG. 4, on connections to line circuit 102, battery is returned from punching 4TA–2 (as opposed to punching 4TB–1 in line circuit 101) and lead 3TA–2, through switching network 11 and lead 2TA–1 to operate relay 2SR, FIG. 2. Since relay 2SR is now operated over lead 2TA–1, battery is no longer available on lead 2TB–1 as it was on connections to line circuit 101. The importance of this different will be more fully appreciated from that which is contained hereinafter.

Concurrent connections from more than one station are established to line circuit 102 in the same manner as previously set forth for concurrent connections to line circuit 101. On such concurrent connections, the transmit capability from the connected stations are sequentially controlled from transmission control 105, FIG. 4 associated with line circuit 102, such that only one of the stations S1 through Sn concurrently connected thereto may initiate transmission.

Since it has been assumed that line circuit 102 may not, under any circumstances, handle transmission from more than one station concurrently, the enabling of an override key 2R at any concurrently connected station is ineffective to override the sequential transmission capability provided by transmission control 105. As detailed in FIG. 2, relay 2PTO cannot operated at this time even if key 2R is operated since battery, as discussed above, is now provided to the station control circuit via lead 2TA–1 thereby back biasing diode 2CR2. Since relay 2PTO cannot operate at this time, relay 2PT in the associated station remains under control of the selector in transmission control 105, FIG. 4 and sequential transmission is retained.

2.5 CONCURRENT CONNECTIONS TO LINE CIRCUIT 103

Concurrent connections to line circuit 103 are established in the same manner as set forth previously for line circuits 101 and 102 except that, as shown in FIG. 4, line circuit 103 does not contain a marginal relay associated with relay 4ST3. Accordingly, regardless of the number of stations connected to line circuit 103 concurrent transmission from all stations is possible without first requiring the operation of a push-to-talk key or an override key at any station.

2.6 CONCLUSION

While the equipment of this invention has been shown in a particular embodiment wherein a switching network is arranged to interconnect key telephone stations with line circuits in a telephone switching system, it is to be understood that such an embodiment is intended only to be illustrative of the present invention and numerous other arrangements may be devised by those skilled in the art without departing from the spirit and scope of the invention.

For example, this invention could be used to provide sequential control, for data transferral purposes, between a group of peripheral terminals and a central data source.

What we claim is:

1. In a telephone system wherein any of a number of stations may be connected to any one of a number of line circuits through a switching network, the combination comprising
   means for detecting the concurrent connection of more than one said station to one said line circuit,
   means for selectively enabling one of said concurrently connected stations, and
   means responsive to said detecting means for inhibiting transmission from all but said selectively enabled connected station.

2. The invention as set forth in claim 1 wherein said selectively enabling means includes
   signaling means at each of said stations,
   signal detection means associated with each of said line circuits operable to detect signals from said stations,
   means associated with each of said line circuits and operable upon said enabling of said concurrent connection detecting means for sequentially connecting said associated signal detection means to each of said concurrently connected stations, and
   means responsive to the enabling of said signal detection means for inhibiting said sequential connecting means.

3. In a key telephone system having a plurality of stations and a switching network for connecting any of said stations to a selected one of a plurality of line circuits, the combination comprising;
   a transmission key at each of said stations;

means associated with each of said stations responsive to a connection from said associated station to one of said line circuits for enabling transmission from said connected station while said associated transmission key is in an unoperated condition;

means responsive to a concurrent connection of two or more stations to the same line circuit for inhibiting said transmission enabling means;

means for sequentially detecting the operational status of said transmission key at each of said concurrently connected stations; and means responsive to a detected operated one of said transmission keys at one of said concurrent connected stations for enabling transmission from said one station while transmission from all other ones of said concurrently connected stations is inhibited.

4. The invention set forth in claim 3 further comprising override means at each of said stations operable for enabling transmission from said station while said associated transmission key is in an unoperated position and while said station is concurrently connected to one of said line circuits and means responsive to a connection between any of said stations and certain predetermined ones of said line circuits for inhibiting the enabling of said override means.

5. In combination in a key telephone system, a plurality of key stations, a plurality of line circuits arranged into groups, means for interconnecting said stations with any of said line circuits, station control means individually associated with each of said stations operable for enabling individual transmission from said station to a line circuit connected therewith, transmission control means individually associated with each of said line circuits in a first and a second group of said line circuits, means in each of said transmission control means operable for providing sequential transmission control to stations connected therewith, means in each of said line circuit in said first and said second group of said line circuits for detecting concurrent connections from at least two of said stations to one of said line circuits, and inhibiting means responsive to the enabling of said detecting means for inhibiting said individual transmission enabling means and for enabling said sequential transmission control means.

6. The invention set forth in claim 5 wherein said sequential transmission control means includes a selector having a plurality of terminal positions each of which is exclusively associated with one of said stations, means for sequentially stepping said selector through said terminal positions, and means responsive to a detected signal at any of said terminal positions for inhibiting said stepping means and for maintaining said selector associated with said detected signal position.

7. The invention set forth in claim 6 wherein said stepping means comprises a controllable free-running multivibrator circuit operable for providing periodic stepping pulses, and wherein said signal detecting means comprises a selector brush operable to contact each of said terminal positions individually and a two stage transistor control circuit connected between said free-running multivibrator circuit and said brush arranged to detect a certain potential on any of said contacted terminal positions.

8. The invention set forth in claim 5 further comprising a first and a second key at each of said stations, said sequential transmission control means including means responsive to the enabling of said first key at one of said stations for providing exclusive transmission capability of said one station, and said station control means including means responsive to the momentary enabling of said second key at any of said stations for permanently overriding the enabling of said inhibiting means thereby providing transmission capability from said station associated with said enabled second key on concurrent connections to a line circuit without regard to the operational status of any of said first keys.

9. The invention set forth in claim 8 wherein said station control means further includes means for inhibiting the enabling of said override means on concurrent connections to line circuits in certain groups of said line circuits.